United States Patent
Huang et al.

(10) Patent No.: US 9,898,927 B2
(45) Date of Patent: Feb. 20, 2018

(54) WI-FI/RADIO FREQUENCY CONVERTING DEVICE

(71) Applicant: GRAND MATE CO., LTD., Taichung (TW)

(72) Inventors: Chung-Chin Huang, Taichung (TW);
Chin-Ying Huang, Taichung (TW);
Hsin-Ming Huang, Taichung (TW);
Hsing-Hsiung Huang, Taichung (TW);
Yen-Jen Yeh, Yunlin County (TW);
Yu-Chin Tsai, Kaohsiung (TW)

(73) Assignee: GRAND MATE CO., LTD., Taichung ( * ) Notice: Subject to any disclaimer, the term of this patent is extended or adjusted under 35 U.S.C. 154(b) by 0 days.

(21) Appl. No.: 15/161,460

(22) Filed: May 23, 2016

(65) Prior Publication Data

US 2016/0267784 A1 Sep. 15, 2016

Related U.S. Application Data

(63) Continuation-in-part of application No. 14/260,725, filed on Apr. 24, 2014, now Pat. No. 9,373,249.

(30) Foreign Application Priority Data

Sep. 11, 2013 (TW) .............................. 102132823 A

(51) Int. Cl.
*G08C 17/02* (2006.01)
*H04W 4/00* (2018.01)
*H04W 84/12* (2009.01)

(52) U.S. Cl.
CPC ............. *G08C 17/02* (2013.01); *H04W 4/008* (2013.01); *G08C 2201/40* (2013.01); *G08C 2201/42* (2013.01); *H04W 84/12* (2013.01)

(58) Field of Classification Search
CPC ..... G08C 17/02; H04L 12/2803; H04W 4/008
USPC ........................................................ 340/5.61
See application file for complete search history.

(56) References Cited

U.S. PATENT DOCUMENTS

| 8,462,734 B2 * | 6/2013 | Laine .................. H04M 1/7253 370/252 |
| 9,288,228 B2 * | 3/2016 | Suumaki ................. H04L 63/18 |
| 9,373,249 B2 * | 6/2016 | Huang .................... G08C 17/02 |
| 2009/0206291 A1 | 8/2009 | Huang et al. |

(Continued)

*Primary Examiner* — Qutbuddin Ghulamali
(74) *Attorney, Agent, or Firm* — Lynette Wylie; Apex Juris, pllc.

(57) ABSTRACT

A Wi-Fi/radio frequency (RF) converting device includes a Wi-Fi transceiver, a multiplexing converting module, an RF transceiver, and an RF extension device. The Wi-Fi transceiver receives a Wi-Fi control signal from a control signal generator, wherein the Wi-Fi control signal contains at least one command. The multiplexing converting module receives the Wi-Fi control signal from the Wi-Fi transceiver, and converts the Wi-Fi control signal into a first wireless control signal or a second wireless control signal. The RF transceiver is electrically connected to the multiplexing converting module, and is connected to at least one electric appliance through RF signals. The RF transceiver receives the first wireless control signal from the multiplexing converting module, and transmits the RF control signal to the electric appliance. The RF extension device transmits the second wireless control signal, which corresponds to at least one another electric appliance, to the at least one another electric appliance.

8 Claims, 7 Drawing Sheets

(56) References Cited

U.S. PATENT DOCUMENTS

2014/0075523 A1* 3/2014 Tuomaala ............. H04L 63/083
                                                                  726/6
2015/0071269 A1* 3/2015 Huang .................. G08C 17/02
                                                                370/338

* cited by examiner ated States Patent (US 9,898,927 B2)

WI-FI/RADIO FREQUENCY CONVERTING DEVICE

RELATED APPLICATION

This application is a continuation in part of U.S. patent application Ser. No. 14/260,725 titled "Wi-Fi/RADIO FREQUENCY CONVERTING DEVICE", the subject matter thereof being fully incorporated herein by reference.

BACKGROUND OF THE INVENTION

1. Technical Field

The present invention relates generally to a signal converter, and more particular to a Wi-Fi/radio frequency (RF) converting device.

2. Description of Related Art

As the development of technology, there are various electric appliances in ordinary homes, such as gas stove, electrical water heater, fan, and so on. There usually is a control device on an electric appliance for manual control of the electric appliance. However, people have to approach the electric appliance to operate the control device. It is very inconvenient for a person who wants to control an electric appliance which is far away, such as an outdoor water heater.

To improve above drawback, a remote control, which is equipped with radio frequency (RF) module to generate RF signals, is provided for control of a specific electric appliance, so that people may control the electric appliances with the specified remote controls.

The remote control provides an easy way of controlling the electric appliance; however, we have more and more remote controls at home as we get more electric appliances. So, we spend longer time in finding the remote control than the time we walk to the electric appliance and operate the control device on it. Besides, as the development of wireless network, most of ordinary homes have Wi-Fi networks. It will be very convenient if the electric appliances at home could be controlled through the Wi-Fi network.

BRIEF SUMMARY OF THE INVENTION

In view of the above, the primary objective of the present invention is to provide a Wi-Fi/RF converting device, which converts Wi-Fi signals into RF signals to control a plurality of electric appliances of an electric appliance at the same time.

The present invention provides a Wi-Fi/radio frequency converting device, including a Wi-Fi transceiver, a multiplexing converting module, a radio frequency transceiver, and a wireless extension device. The Wi-Fi receives a Wi-Fi control signal from a control signal generator, wherein the Wi-Fi control signal contains at least one command. The multiplexing converting module is electrically connected to the Wi-Fi transceiver, wherein the multiplexing converting module receives the Wi-Fi control signal from the Wi-Fi transceiver and converts the Wi-Fi control signal into a first wireless control signal or a second wireless control signal corresponding to the command. The radio frequency transceiver is electrically connected to the multiplexing converting module, and is wirelessly connected to at least one electric appliance through radio frequency signals, wherein the radio frequency transceiver receives the first wireless control signal from the multiplexing converting module, and transmits the first wireless control signal to the at least one electric appliances. The wireless extension device is detachably electrically connected to the multiplexing converting module, and is wirelessly connected to another at least one electric appliance, wherein the wireless extension device transmits the second wireless control signal, which is sent out by the multiplexing converting module and corresponds to the another at least one, to the another at least one electric appliances.

The present invention further provides a Wi-Fi/radio frequency converting device, which includes a Wi-Fi transceiver, a multiplexing converting module, a radio frequency transceiver, and a wireless extension device. The Wi-Fi transceiver receives a Wi-Fi control signal from a control signal generator, wherein the Wi-Fi control signal contains at least one first command. The multiplexing converting module is electrically connected to the Wi-Fi transceiver, wherein the multiplexing converting module converts the Wi-Fi control signal received by the Wi-Fi transceiver into a radio frequency control signal corresponding to the first command. The radio frequency transceiver is electrically connected to the multiplexing converting module, and is wirelessly connected to at least one electric appliances through radio frequency signals; after receiving the radio frequency control signal sent out by the multiplexing converting module, the radio frequency transceiver transmits the radio frequency control signal to the at least one electric appliance. The wireless extension device is detachably connected to the multiplexing converting module; wherein the wireless extension device receives a wireless signal containing an identification code, and transmits the identification code to the multiplexing converting module; wherein, based on the received identification code, the multiplexing converting module further transmits the radio frequency control signal containing a second command to the radio frequency transceiver.

With such design, it may convert the Wi-Fi signals into the RF signals to control a plurality of the electric appliances at the same time.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
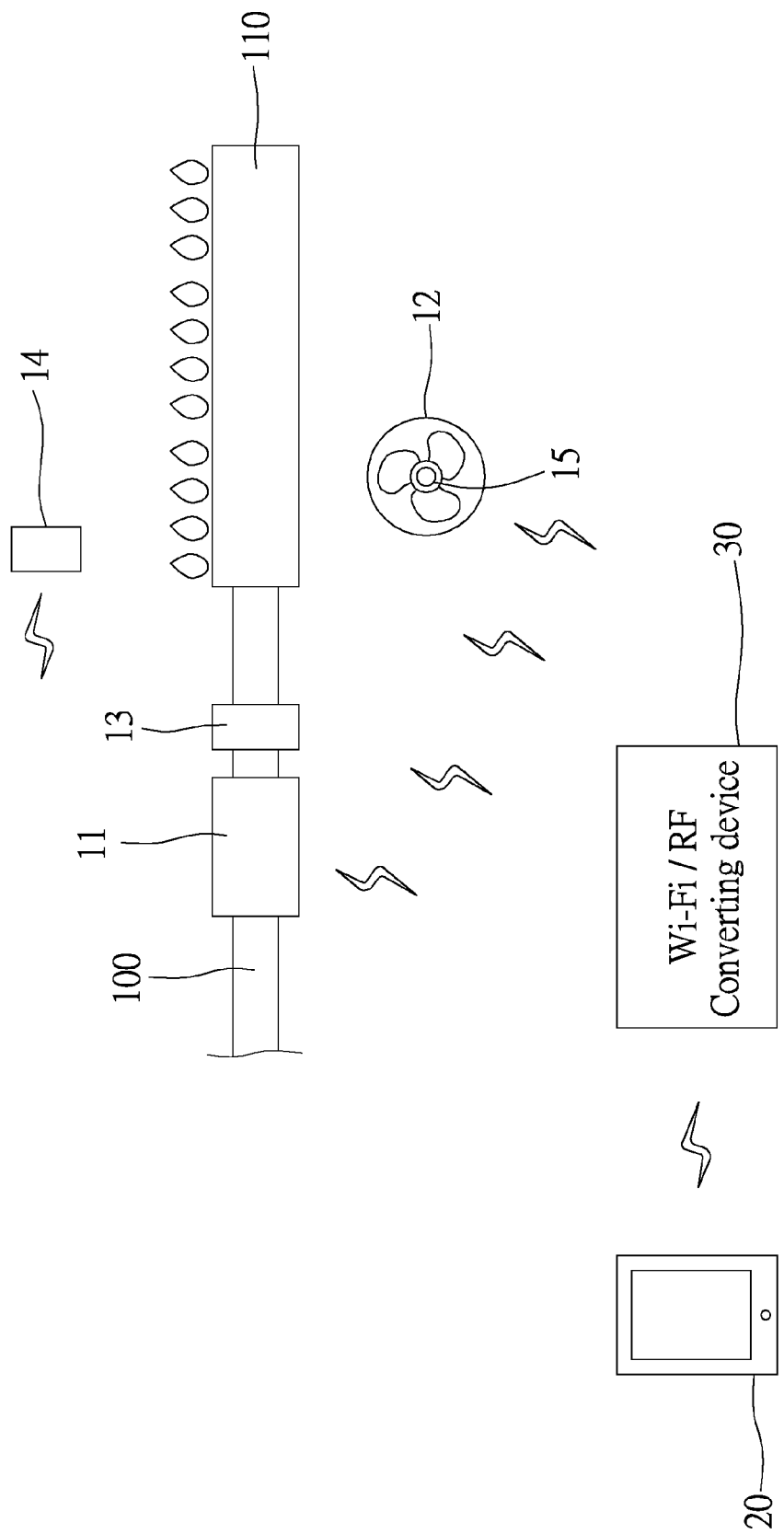
FIG. 1 is a sketch diagram of the wireless control system of a first preferred embodiment of the present invention.

As shown in FIG. 1, a wireless control system of the present invention includes a plurality of electric appliances 11-15, a control signal generator 20, and a Wi-Fi/radio frequency (RF) converting device 30.

Figure 2:
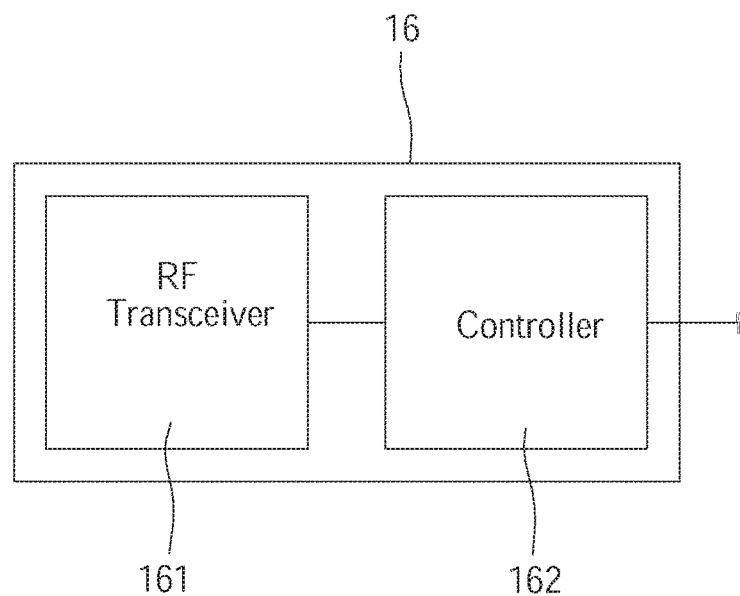
FIG. 2 is block diagram of the controlling device of the first preferred embodiment of the present invention.

In an embodiment of the present invention, the electric appliances 11-15 are components of an electric appliance. For example, the electric appliance is a fireplace, and the electric appliances include a solenoid valve 11, a blower 12, and three sensors 13-15. The solenoid valve 11 is mounted in a gas pipe 100, which supplies gas with burners 110 of the fireplace. The solenoid valve 11 works according to an electric signal to turn the solenoid valve 11 on/off, or to adjust a gas flow through the solenoid valve 11. In an embodiment, the solenoid valve 11 uses the solenoid valve taught in U.S. patent 2009/0206291A1, which is a ratio solenoid valve to be controlled by a voltage of the electric signal. In practice, any solenoid valve which is controlled by electric signals should be applied in the present invention. The blower 12 supplies airflow to the burners 110. The sensor 13 is provided on the gas pipe 100 between the burners 110 and the solenoid valve 11, the sensor 14 is beside the burners 110, and the sensor 15 is on the blower 12. The sensors 13-15 respectively sense a gas flow in the gas pipe 100, a temperature of the burners 110, and a speed of a motor of the blower 12. As shown in FIG. 2, each electric appliance 11-15 has a controlling device 16, and each controlling device 16 has a radio frequency (RF) transceiver 161 and a controller 162. The RF transceiver 161 transmits and receives RF signals, and the controller 162 controls the corresponding electric appliance according to the RF signals received by the RF transceiver 161.

In an embodiment, the control signal generator 20 is a smart phone, which is installed with a specific application for user to input commands to control the electric appliances 11-15, such as turn on/off or adjust the electric appliances 11-15. The control signal generator 20 may code and package the commands into a Wi-Fi control signal, and the commands will be sent to the electric appliance through the Wi-Fi/RF converting device 30. The control signal generator 20 may be replaced by any electronic device, such as desktop, laptop, tablet, or PDA, which is able to transmit signals through Wi-Fi.

Figure 3:
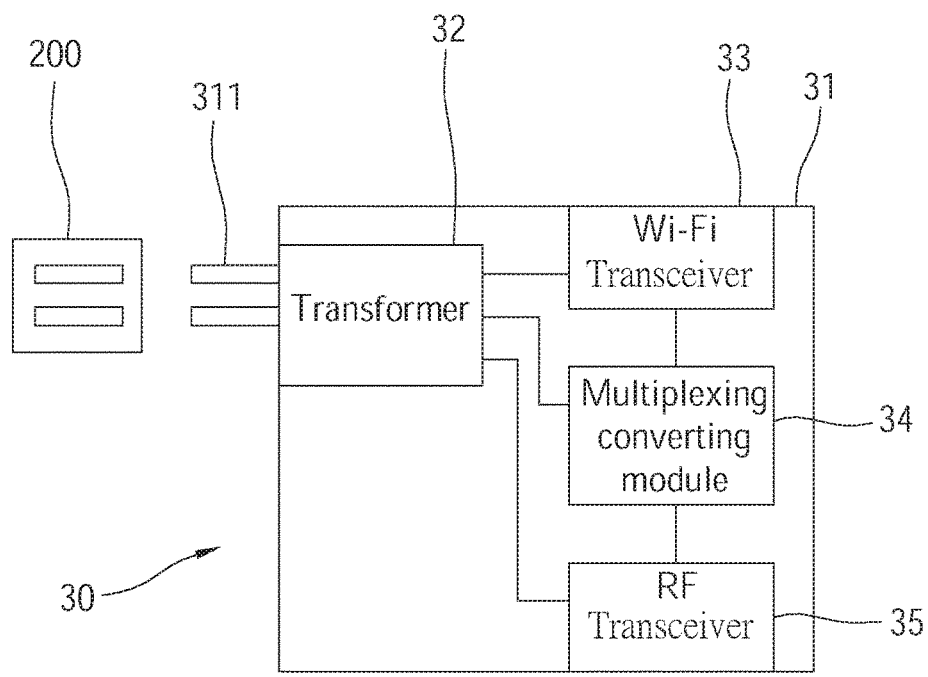
FIG. 3 is a block diagram of the Wi-Fi/RF converting device of the first preferred embodiment of the present invention.

As shown in FIG. 3, the Wi-Fi/RF converting device 30 includes a case 31, in which a transformer 32, a Wi-Fi transceiver 33, a multiplexing converting module 34, and a radio frequency (RF) transceiver 35 are received. The case 31 is an 8×5×5 cm³ rectangular box. A plug 311 is provided on the case 31. The transformer 32 is connected to the plug 311 to convert a voltage (110V) of a power line into a work voltage (12V) for the Wi-Fi transceiver 33, the multiplexing converting module 34, and the RF transceiver 35. The Wi-Fi transceiver 33 receives the Wi-Fi control signals from the control signal generator 20. The multiplexing converting module 34 is connected to the Wi-Fi transceiver 33 to convert the Wi-Fi control signals into RF control signals, and then the RF control signals is sent to RF transceivers 161 of the electric appliances 11-15 through the RF transceiver 35 to control the electric appliances 11-15 accordingly.

When a user connects the plug 311 to a socket 200 of the power line, the transformer 32 will supply the Wi-Fi transceiver 33, the multiplexing converting module 34, and the RF transceiver 35 with essential power, and the Wi-Fi/RF converting device 30 may work. Then, the user may operate the control signal generator 20 to control the electric appliances 11-15 through the Wi-Fi/RF converting device 30.

User may monitor the electric appliances 11-15 through the Wi-Fi/RF converting device 30 of the present invention in an opposite way. For example, the sensing results of the sensors 13-15, so called RF data signals, are sent to the RF transceiver 35 of the Wi-Fi/RF converting device 30, by the control of the controllers 162, through the RF transceivers 161 respectively, and then are converted into Wi-Fi data signals by the multiplexing converting module 34. Next, the Wi-Fi data signals are sent to the control signal generator 20 through the Wi-Fi transceiver 33. As a result, the data of the electric appliances 11-15 may be shown on the control signal generator 20.

Figure 4:
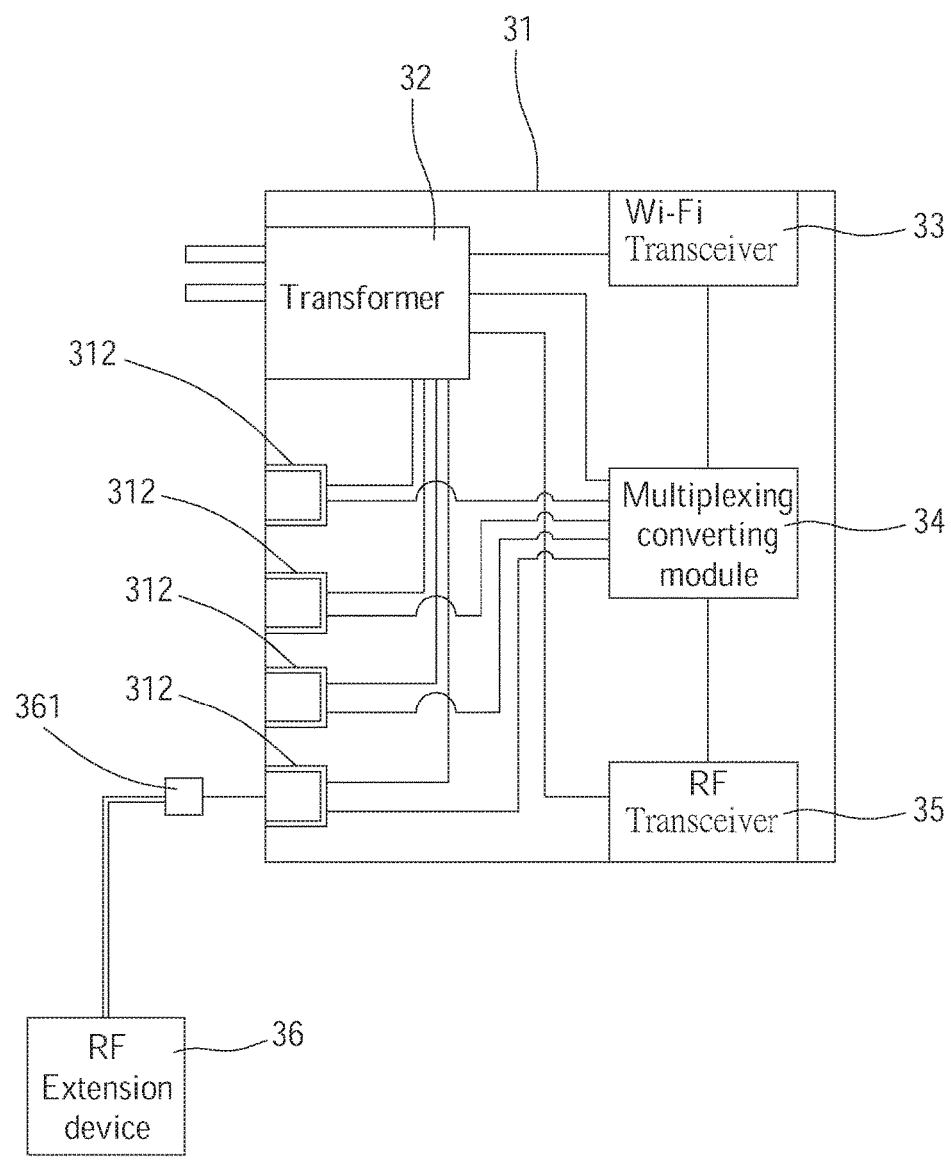
FIG. 4 is a block diagram of the Wi-Fi/RF converting device of the second preferred embodiment of the present invention.

FIG. 4 shows a Wi-Fi/RF converting device of the second preferred embodiment, in which the case 31 is provided with several ports 312. All the ports 312 are connected to the multiplexing converting module 34. A RF extension device 36 has a connector 361 to engage the port 312. The RF extension device 36 has the same function as the RF transceiver 35 to receive and transmit RF signals. The RF extension device 36 is in communication with some of the electric appliances, and the RF transceiver 35 is in communication with the rest of the electric appliances.

The RF extension device 36 and the RF transceiver 35 share the RF signals transmission between the Wi-Fi/RF converting device and the electric appliances to reduce the delay in signal transmission when there are too many electric appliances in control. It is easy to understand that four RF extension devices 36 may be connected to the Wi-Fi/RF converting device of the second preferred embodiment for controlling more electric appliances. In an embodiment, a frequency of the signal transmission through the RF transceiver 35 is different from that through the RF extension device 36 to avoid interference. For example, the frequency of the RF transceiver 35 is 433 MHz, and the RF extension device 36 is 315 MHz.

Figure 5:
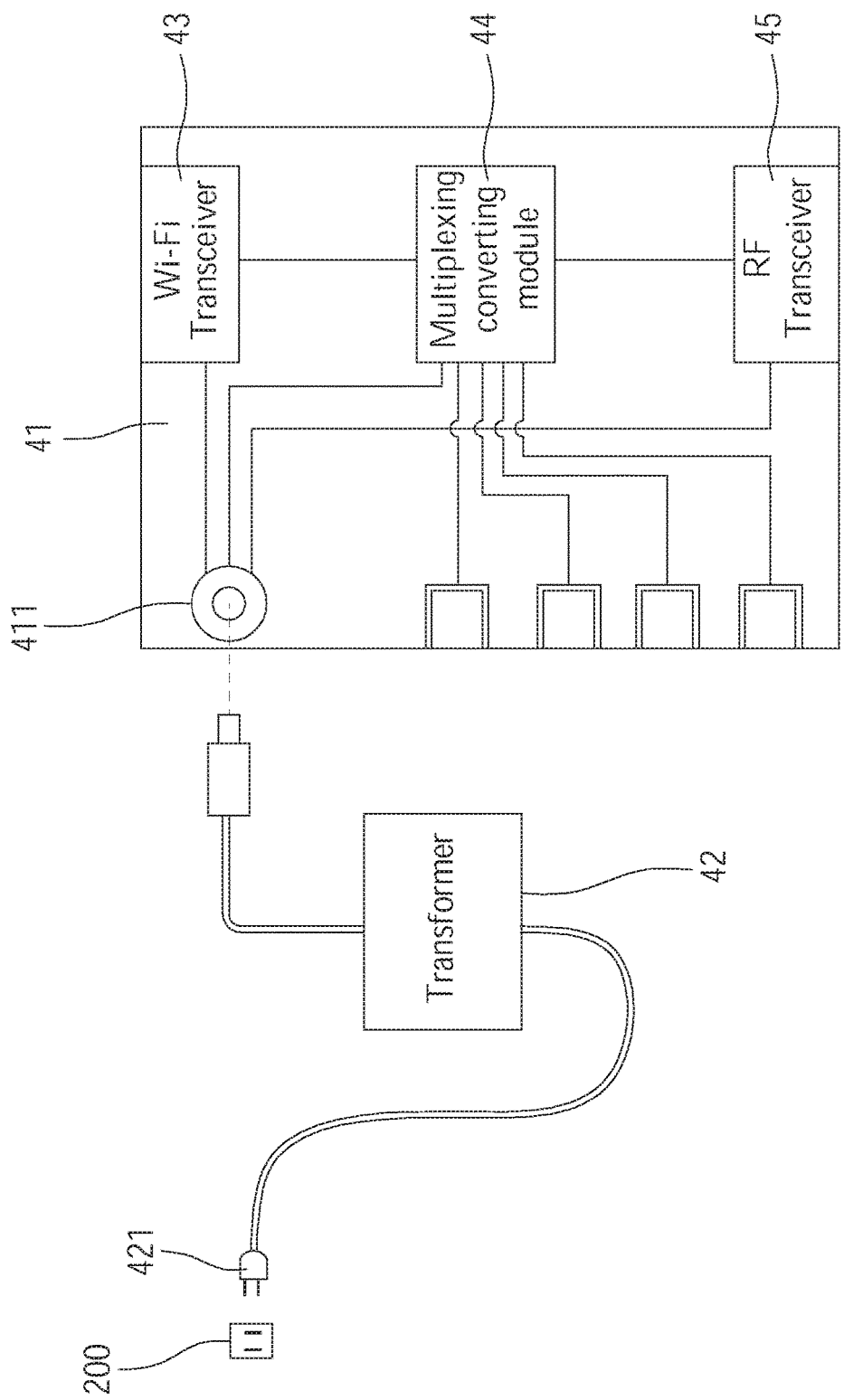
FIG. 5 is a block diagram of the Wi-Fi/RF converting device of the third preferred embodiment of the present invention.

FIG. 5 shows a Wi-Fi/RF converting device 40 of the third preferred embodiment of the present invention, in which a transformer 42 is noted received in a case 41. A plug 421 is provided on the transformer 42 instead of on the case 41 to engage a socket 200 of the power line. The case 41 has a power port 411, and the transformer 42 has a wire and a connector at a distal end of the wire. The connector of the transformer 42 engages the power port 411 to supply a Wi-Fi transceiver 43, a multiplexing converting module 44, and an RF transceiver 45, which are received in the case 41, with power. This design makes the case 41 to be put on a suitable place where is away from the socket 200.

Figure 6:
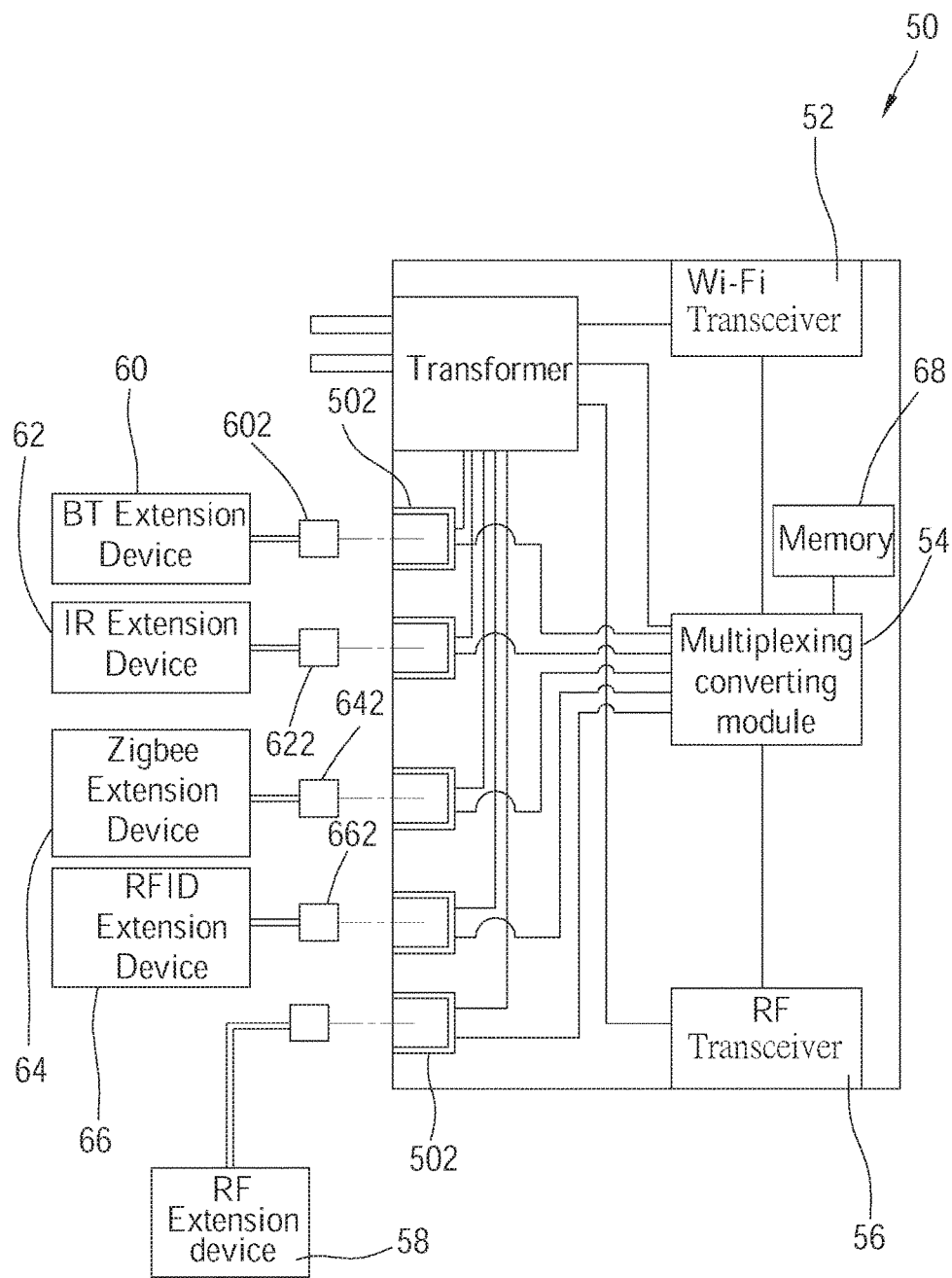
FIG. 6 is a block diagram of the Wi-Fi/RF converting device of the fourth preferred embodiment of the present invention.

A Wi-Fi/RF converting device 50 of the fourth preferred embodiment of the present invention is shown in FIG. 6, which is designed based on the Wi-Fi/RF converting device 31 of the second preferred embodiment. In addition to a Wi-Fi transceiver 52, a multiplexing converting module 54, an RF transceiver 56, ports 502, and a wireless extension device, which is an RF extension device 58 as an example, the Wi-Fi/RF converting device 50 further includes a plurality of wireless extension devices 60-66, each of which respectively has a connector 602-662, wherein each of the connectors 602-662 is detachably connected to one of the ports 502, whereby the connectors 602-662 are electrically connected to the multiplexing converting module 54. The wireless extension devices 60-66 include a Bluetooth (BT) extension device 60, an infrared (IR) extension device 62, a ZigBee extension device 64, and an RFID extension device 66.

The Wi-Fi transceiver 52 receives a Wi-Fi control signal which contains at least one first command. Once the Wi-Fi transceiver 52 has received the Wi-Fi control signal, the multiplexing converting module 54 converts the Wi-Fi control signal into an RF control signal (i.e., a first wireless control signal) corresponding to the first command, and then the first wireless control signal is transmitted to the RF transceiver 56. Or, alternatively, the multiplexing converting module 54 converts the Wi-Fi control signal into a Bluetooth control signal, an infrared control signal, or a ZigBee control signal, which also correspond to the first command, and transmits the control signal to the BT extension device 60, the IR extension device 62, or the ZigBee extension device 64. The Bluetooth control signal, the infrared control signal, or the ZigBee control signal is a second wireless control signal. Once the RF transceiver 56 has received the RF control signal transmitted by the multiplexing converting module 54, the RF transceiver 56 sends out the received RF control signal. Similarly, once the BT extension device 60, the IR extension device 62, or the ZigBee extension device 64 has received the Bluetooth control signal, the infrared control signal, or the ZigBee control signal transmitted by the multiplexing converting module 54, the BT extension device 60, the IR extension device 62, or the ZigBee extension device 64 sends out the received Bluetooth control signal, infrared control signal, or ZigBee control signal.

Figure 7:
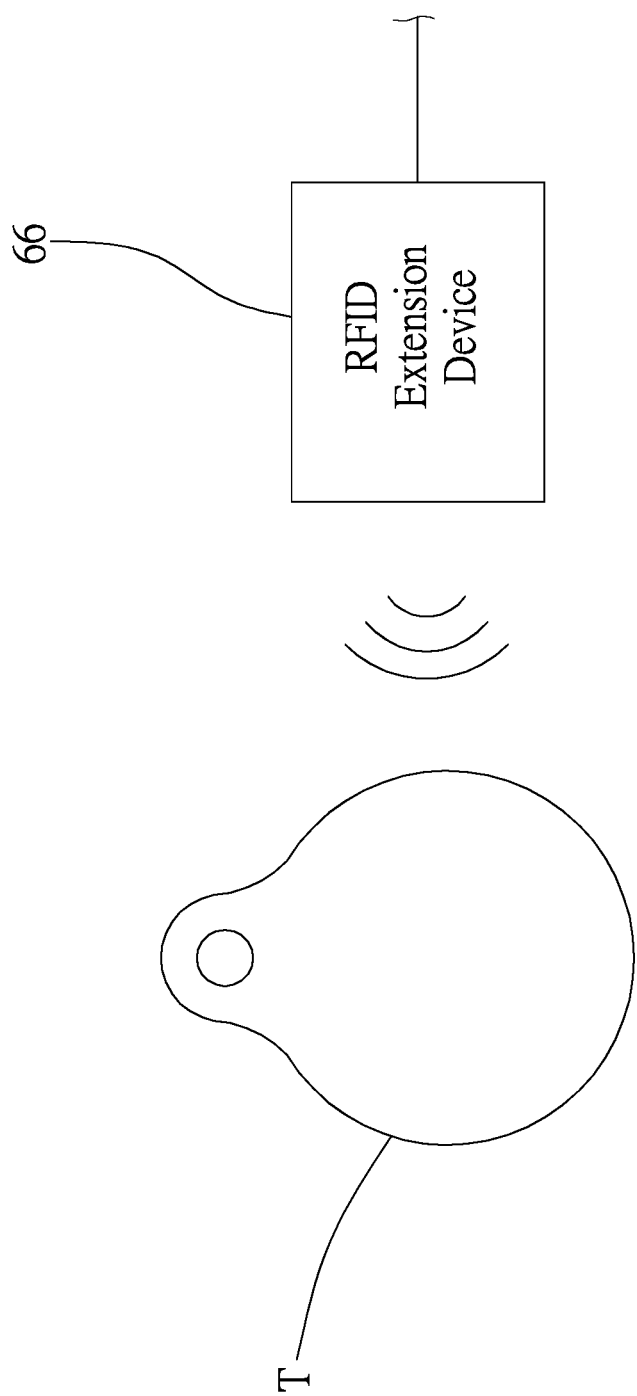
FIG. 7 is a schematic view, showing the RFID extension device of the four preferred embodiment of the present invention notifies the electronic tag.

As shown in FIG. 7, the RFID extension device 66 sends out a detecting signal to an electronic tag T. Once the detecting signal has been received, the electronic tag T responses with a wireless signal containing an identification code. Once the RFID extension device 66 has received the wireless signal, the RFID extension device 66 transmits the identification code to the multiplexing converting module 54.

After the multiplexing converting module 54 receiving the identification code, the multiplexing converting module 54 transmits an RF control signal containing a second command based on the identification code to the RF transceiver 56, or, transmits an RF control signal containing the second command the RF extension device, or, sends out a Bluetooth control signal, an infrared control signal, or a ZigBee control signal containing the second command to the BT extension device 60, the IR extension device 62, or the ZigBee extension device 64. With such design, the second command could be transmitted within the RF control signal sent out by the RF transceiver 56, or could be transmitted within the RF control signal through the RF extension device 58, or could be transmitted within the Bluetooth control signal, the infrared control signal, or the ZigBee control signal through the BT extension device 60, the IR extension device 62, or the ZigBee extension device 64.

In the fourth preferred embodiment, the Wi-Fi/RF converting device 50 further includes a memory 68 electrically connected to the multiplexing converting module 54, wherein the correspondences between different identification codes and different second commands are saved in the memory 68. Each of the second commands is used to control a specific electric appliance, which is connected to the RF transceiver 56, the RF extension device 58, the BT extension device 60, the IR extension device 62, or the ZigBee extension device 64, to perform an operation. The multiplexing converting module 54 retrieves the second command from the memory 68 based on the received identification code, and then correspondingly sends out the RF control signal which contains the second command to the RF transceiver 56 or the RF extension device 58, or sends out the Bluetooth control signal, the infrared control signal, or the ZigBee control signal containing the second command to the BT extension device 60, the IR extension device 62, or the ZigBee extension device 64.

Figure 8:
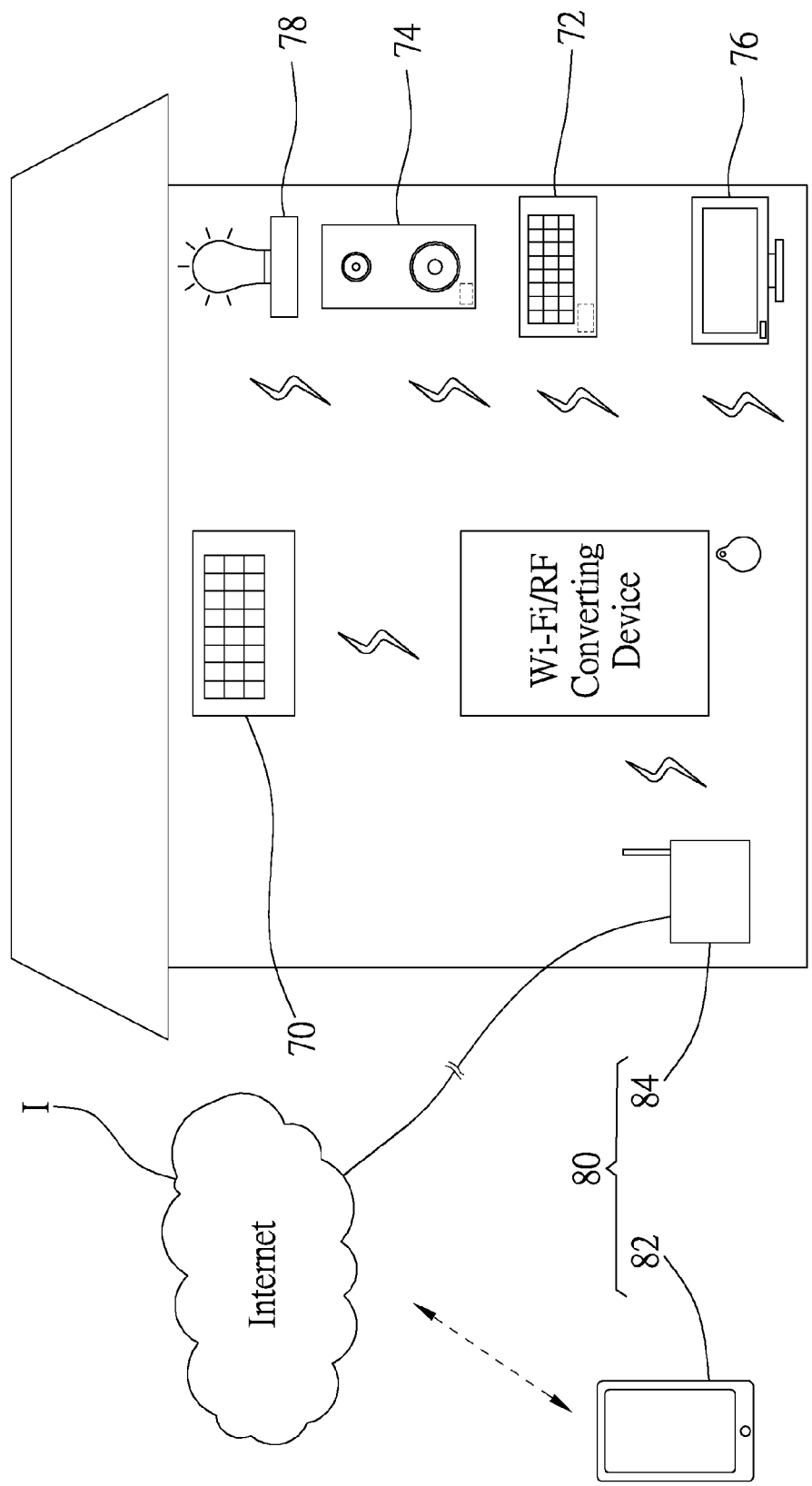
FIG. 8 is a sketch diagram of the wireless control system with the Wi-Fi/RF converting device of the fourth preferred embodiment of the present invention.

A wireless control system having the Wi-Fi/RF converting device 50 of the fourth preferred embodiment of the present invention is shown in FIG. 8, wherein the wireless control system further includes a plurality of electric appliances 70-76 and a control signal generator 80.

The electric appliances 70-76 are located at a user end, including two air conditioners 70, 72, a stereo system 74, a television set 76, and an electric lamp 78, wherein the air conditioners 70, 72 are wirelessly connected to the RF transceiver 56 and the RF extension device 58 through RF control signals, respectively; the stereo system 74 is wirelessly connected to the BT extension device 60 through Bluetooth control signals; the television set 76 is wirelessly connected to the IR extension device 62 through infrared control signals; the electric lamp 78 is wirelessly connected to the ZigBee extension device 64 through ZigBee control signals.

The control signal generator 80 includes an electronic device, which is a smartphone 82 as an example, and a wireless access point 84, wherein the smartphone 82 is connected to the wireless access point 84 through Internet I, while the wireless access point 84 is located at the user end, and is wirelessly connected to the Wi-Fi transceiver 52 of the Wi-Fi/RF converting device 50 through Wi-Fi control signals.

A user could use the smartphone 82 to set up the first command, for example, to switch on the air conditioner 70. The smartphone 82 would send out the Wi-Fi control signal with the first command contained therein to the Wi-Fi transceiver 52 through the wireless access point 84. Once the Wi-Fi transceiver 52 has received the Wi-Fi control signal, the multiplexing converting module 54 would converts the Wi-Fi control signal into the RF control signal, which corresponds to the first command, and transmits the RF control signal to the RF transceiver 56, so that the RF control signal could be transmitted to the air conditioner 70 to switch on the air conditioner 70.

If the user uses the smartphone 82 to set up two first commands, which are respectively designated to switch on the television set 76 and the stereo system 74, the Wi-Fi transceiver 52 would receive the Wi-Fi control signal containing the two first commands. After that, the multiplexing converting module 54 would converts the Wi-Fi control signal into the infrared control signal, which corresponds to one of the first commands, and transmits the infrared control device to the IR extension device 62, so that the infrared control signal could be transmitted to the television set 76 to switch on the television set 76. On the other hand, the multiplexing converting module 54 would convert the Wi-Fi control signal into the Bluetooth control signal, which corresponds to the other first command, and transmits the Bluetooth control signal to the BT extension device 60, so that the Bluetooth control signal could be transmitted to the stereo system 74 to switch on the stereo system 74.

In addition, the user could also use the smartphone 82 to transmit the correspondences between the identification codes of different electronic tags T and the second commands corresponded by the identification codes to the Wi-Fi/RF converting device 50 in advance, wherein the correspondences could be saved in the memory 68. Said second commands could be defined by the user as the electric appliances to be controlled, or the operations of the electric appliances. For example, the second command corresponding to the a first electronic tag commands one of the air conditioners 70 to be switched on, the second command corresponding to a second electronic tag commands the other air conditioner 72 to be switched on, and the second command corresponding to a third electronic tag commands the electric lamp 78 to be turned on. Whereby, if the user enters a detecting range of the detecting signals sent by the RFID extension device 66 with the first electronic tag, the first electronic tag would feedback the wireless signal containing the identification code. Once the RFID extension device 66 has received the wireless signal, the identification code of the first electronic tag would be transmitted to the multiplexing converting module 54. After receiving the identification code, the multiplexing converting module 54 transmits the RF control signal, which contains the second command retrieved from the memory 68 based on the identification code of the first electronic tag, to the RF transceiver 56, so that the RF control signal could be transmitted to the air conditioner 70 to switch on the air conditioner 70.

Similarly, if the user enters a detecting range of the detecting signals send by the RFID extension device 66 with the second or the third electronic tag, the multiplexing converting module 54 would perform almost the same, yet somewhat different, actions. More specifically, with the second electronic tag, the RF extension device 58 is taken as the RF transceiver, which would transmit the RF control signal containing the second command to the air conditioner 72 to switch on the air conditioner 72; with the third electronic tag, the multiplexing converting module 54 would transmit the ZigBee control signal containing the second command to the ZigBee extension device 64, so that the ZigBee control signal would be transmitted to the electric lamp 78 to turn on the electric lamp 78.

Furthermore, each of the electric appliances 70-78 would routinely decode the operational status into wireless signals, and send to the corresponding RF transceiver 56, RF extension device 58, BT extension device 60, or ZigBee extension device 64. Once the wireless signals sent by the electric appliances 70-78 has reached the RF transceiver 56, the RF extension device 58, the BT extension device 60, or the ZigBee extension device 64, the multiplexing converting module 54 would further convert each of the received wireless signals into a Wi-Fi control signal, which would be transmitted to the wireless access point 84 through the Wi-Fi transceiver 52, and finally transmitted to the smartphone 82, whereby the operational status of the electric appliances 70-78 could be displayed on the smartphone 82.

As described above, with the different wireless extension devices 58-66 disclosed in the fourth preferred embodiment of the present invention, the applicability of the Wi-Fi/RF converting device 50 is further improved. In practice, there could be only one of the wireless extension devices 58-66 disclosed in the fourth preferred embodiment connected to the multiplexing converting module 54.

It must be pointed out that the embodiments described above are only some preferred embodiments of the present invention. All equivalent structures which employ the concepts disclosed in this specification and the appended claims should fall within the scope of the present invention.

What is claimed is:

1. A Wi-Fi/radio frequency converting device, comprising:
   a Wi-Fi transceiver which receives a Wi-Fi control signal from a control signal generator, wherein the Wi-Fi control signal contains at least one command;
   a multiplexing converting module electrically connected to the Wi-Fi transceiver, wherein the multiplexing converting module receives the Wi-Fi control signal from the Wi-Fi transceiver and converts the Wi-Fi control signal into a first wireless control signal or a second wireless control signal corresponding to the at least one command;
   a radio frequency transceiver, which is electrically connected to the multiplexing converting module, and is wirelessly connected to at least one electric appliance through radio frequency signals, wherein the radio frequency transceiver receives the first wireless control signal from the multiplexing converting module, and transmits the first wireless control signal to the at least one electric appliance, and
   a wireless extension device, which is detachably electrically connected to the multiplexing converting module, and is wirelessly connected to another at least one electric appliance, wherein the wireless extension device transmits the second wireless control signal, which is sent out by the multiplexing converting module and corresponds to the another at least one, to the another at least one electric appliance.

2. The Wi-Fi/radio frequency converting device of claim 1, wherein the wireless extension device further receives a wireless signal sent by the another at least one electric appliance, and the multiplexing converting module further coverts the wireless signal received by the wireless extension device into a Wi-Fi control signal, which is transmitted to the control signal generator through the Wi-Fi transceiver.

3. The Wi-Fi/radio frequency converting device of claim 1, wherein the second wireless control signal is a Bluetooth control signal, a ZigBee control signal, or an infrared control signal.

4. The Wi-Fi/radio frequency converting device of claim 1, further comprising another wireless extension device, which is detachably electrically connected to the multiplexing converting module, wherein the another wireless extension device receives a wireless signal which contains an identification code, and transmits the identification code to the multiplexing converting module;
   wherein, based on the receive identification code, the multiplexing converting module sends out the first wireless control signal containing another command to the RF transceiver, or sends out the second wireless control signal containing the another command to the wireless extension device.

5. The Wi-Fi/radio frequency converting device of claim 1, further comprising a memory electrically connected to the multiplexing converting module, wherein a correspondence between the identification code and the another command is saved in the memory; the another command corresponds to the at least one electric appliance or the another at least one electric appliance; based on the identification code, the multiplexing converting module retrieves the another command from the memory, wherein the multiplexing converting module sends out the first wireless control signal containing the another command to the radio frequency transceiver, or sends out the second wireless control signal containing the another command to the wireless extension device.

6. A Wi-Fi/radio frequency converting device, comprising:
   a Wi-Fi transceiver which receives a Wi-Fi control signal from a control signal generator, wherein the Wi-Fi control signal contains at least one first command;
   a multiplexing converting module electrically connected to the Wi-Fi transceiver, wherein the multiplexing converting module converts the Wi-Fi control signal received by the Wi-Fi transceiver into a radio frequency control signal corresponding to the first command;

a radio frequency transceiver electrically connected to the multiplexing converting module, and is wirelessly connected to at least one electric appliance through radio frequency signals; after receiving the radio frequency control signal sent out by the multiplexing converting module, the radio frequency transceiver transmits the radio frequency control signal to the at least one electric appliance; and a wireless extension device, which is detachably connected to the multiplexing converting module; wherein the wireless extension device receives a wireless signal containing an identification code, and transmits the identification code to the multiplexing converting module;

wherein, based on the received identification code, the multiplexing converting module further transmits the radio frequency control signal containing a second command to the radio frequency transceiver.

7. The Wi-Fi/radio frequency converting device of claim 6, further comprising a memory electrically connected to the multiplexing converting module, wherein a correspondence between the identification code and the second command is saved in the memory; the second command corresponds to the at least one electric appliance; based on the identification code, the multiplexing converting module retrieves the second command from the memory, and transmits the radio frequency control signal containing the second command to the RF transceiver.

8. The Wi-Fi/radio frequency converting device of claim 6, wherein the RF transceiver is detachably electrically connected to the multiplexing converting module.

* * * * *